United States Patent
Ferguson

(10) Patent No.: US 10,162,877 B1
(45) Date of Patent: Dec. 25, 2018

(54) AUTOMATED COMPILATION OF CONTENT

(71) Applicant: VCE Company, LLC, Richardson, TX (US)

(72) Inventor: Colin Yale Ferguson, Watertown, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 156 days.

(21) Appl. No.: 14/109,172

(22) Filed: Dec. 17, 2013

(51) Int. Cl.
*G06F 17/30* (2006.01)

(52) U.S. Cl.
CPC .............. *G06F 17/30598* (2013.01)

(58) Field of Classification Search
CPC .......... G06F 13/102; G06F 17/30595; G06F 15/177; G06F 17/30867; G06F 21/71; G06F 11/1469; G06F 21/10; G06F 17/30569
See application file for complete search history.

(56) References Cited

U.S. PATENT DOCUMENTS

| | | | | |
|---|---|---|---|---|
| 8,370,341 B1* | 2/2013 | Cromwell | ......... | G06F 17/30073 707/662 |
| 2003/0139975 A1* | 7/2003 | Perkowski | ........ | G06F 17/30879 705/14.73 |
| 2005/0257400 A1* | 11/2005 | Sommerer | ........ | G06F 17/30873 36/13 |
| 2010/0023952 A1* | 1/2010 | Sandoval | .......... | G06F 17/30569 719/318 |
| 2011/0119240 A1* | 5/2011 | Shapira | ............. | G06F 17/30067 707/693 |
| 2013/0014106 A1* | 1/2013 | Imai | ........................ | H04L 45/54 718/1 |
| 2014/0289391 A1* | 9/2014 | Balaji | ..................... | H04L 43/04 709/224 |

* cited by examiner

*Primary Examiner* — Mariela Reyes
*Assistant Examiner* — Courtney Harmon
(74) *Attorney, Agent, or Firm* — Polsinelli PC

(57) ABSTRACT

Implementations described and claimed herein provide systems and methods for automatically compiling content for a particular project. In one implementation, a compilation template for the particular project is retrieved. The compilation template has instructions for compiling a plurality of content files. The compilation instructions include a designation for each of the content files including a path to a source of the content file and a target file type. Each of the content files is retrieved from the source, and each of the retrieved content files has a source file type. Each of the retrieved content files is modified from the source file type to the target file type. The modified content files are compiled into a content set based on the compilation instructions. A framework is generated to display the compiled content set. An archive file storing the generated framework for displaying the compiled content set is output.

18 Claims, 5 Drawing Sheets

AUTOMATED COMPILATION OF CONTENT

TECHNICAL FIELD

Aspects of the present disclosure relate to content and/or data compilation, among other functions, and more particularly to automatically generating a compiled content set.

BACKGROUND

Many industries provide complex products and/or services to customers accompanied by detailed documentation explaining the products and/or services. This documentation often differs for each customer depending on the unique attributes of the product and/or service provided to a particular customer. Further, portions of the documentation may be created by different groups or persons in different formats and stored in various locations, and/or portions of the documentation may need redaction or deletion prior to dissemination to the customer. To provide the documentation to the customer, the portions of the documentation need to be collected from the various locations, modified, and compiled.

Collecting and compiling the documentation is generally a time intensive and inefficient labor. For example, many industries manually collect and compile the documentation and manually customize the compiled documentation for a particular customer. These challenges are further exacerbated where content needs modifying or converting from its original format before inclusion in the documentation or where portions of the documentation are out of date.

SUMMARY

Implementations described and claimed herein address the foregoing problems, among others, by providing systems and methods for automatically generating a compiled content set for a particular project. In one implementation, a compilation template for the particular project is retrieved. The compilation template has instructions for compiling a plurality of content files. The compilation instructions include a designation for each of the content files including a path to a source of the content file and a target file type. Each of the content files is retrieved from the source, and each of the retrieved content files has a source file type. Each of the retrieved content files is modified from the source file type to the target file type. The modified content files are compiled into a content set based on the compilation instructions. A framework is generated to display the compiled content set.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
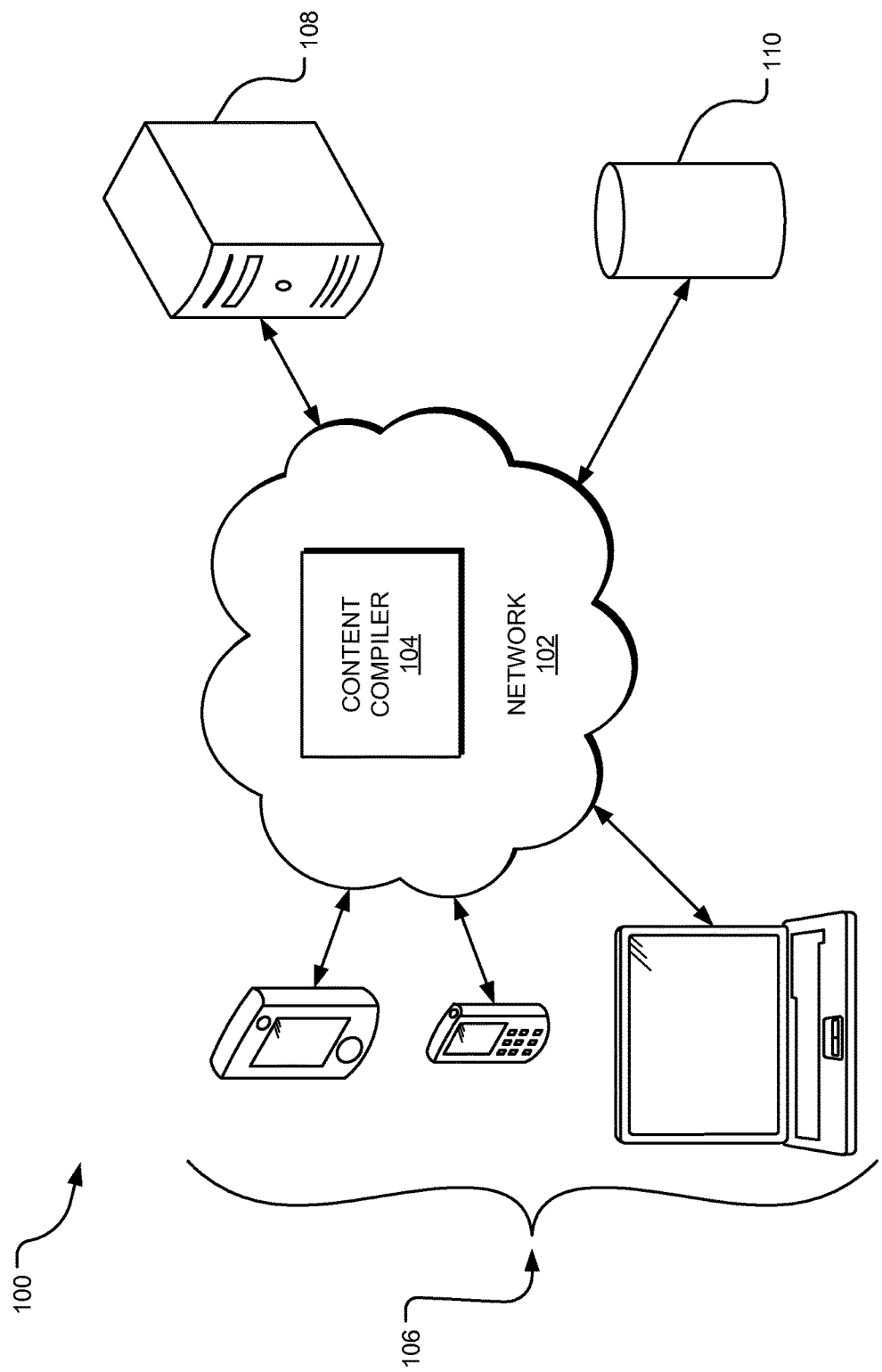
FIG. 1 illustrates an example system for automatically generating a compiled content set for a particular project, according to one embodiment.

Aspects of the present disclosure involve systems and methods for automatically creating a content compilation for a particular project. Generally, a user selects a compilation type corresponding to the particular project, which retrieves and pre-populates a compilation template. In the compilation template, the user specifies a plurality of content files to include in a compiled content set and any modifications (e.g., conversions, redactions, search/replace operations, deletions, etc.) to be performed on the content files prior to inclusion. A content compiler automatically performs the specified modifications and compiles the content files in accordance with compilation instructions in the compilation template. The content compiler generates a framework (e.g., a website; a printed document set; a file of various formats, such as a PDF; a mobile phone, tablet, and/or ebook application; etc.) for displaying the compiled content set that is easily navigable and accessible. The framework may be customized for the particular project and/or the recipient. For example, the framework may include an introduction, table of contents, and/or index customized for the particular project and/or recipient and linking each of the files in the compiled content set. The content compiler may output the framework in an archive file (e.g., a zip file) for distribution to a recipient, such as a customer. To access the framework, the recipient uncompresses the archive file and opens an index or startup file, which causes the framework to display and permits the recipient to navigate the compiled content set. It will be appreciated that other outputs for storing and distributing the generated framework are contemplated.

In one aspect, the particular project involves configuration of a converged infrastructure for a particular customer. A converged infrastructure generally refers to a specific type of computing infrastructure that packages multiple, heterogeneous computing components into a single, optimized computing platform. Converged infrastructures are often used in the Information Technology ("IT") context in an attempt to centralize, consolidate, and optimize the management of IT computing components and resources. Typical computing components include servers, storage devices, virtualization components, network components, and the like. Additionally, converged infrastructures may include application software for the management, automation, and/or orchestration of pools of computing components. The pooled computing components may be utilized, for example, as a service, at one or more user devices over a network. In one particular example, the converged infrastructure is a Vblock™ Systems converged infrastructure governed by management software (e.g., VCE Vision™ Intelligent Operations) that provides an integrated set of software tools for managing various computing components.

When a converged infrastructure is sold to a particular customer, the customer is provided a large amount of documentation detailing the converged infrastructure as configured for the particular customer. For example, descriptions of the configuration of each of the computing components, such as port assignments, architecture overview, network information, and the like, are provided to the customer. To compile the documentation and customize it for the particular customer, a user selects converged infrastructure using the content compiler and a type of converged infrastructure (e.g., Vblock™ System 700). Based on the selections, the content compiler retrieves and pre-populates a compilation template with fields and/or data associated with the selected type of converged infrastructure. For example, the content compiler may pre-populate the compilation template with designations to current versions of standard content files associated with the selected type of converged infrastructure. Stated differently, the content compiler may automatically determine the correct standard content files to include based on the converged infrastructure type. Alternatively or additionally, the content compiler may filter available standard content files based on the selected type of converged infrastructure and present the user with the filtered list to select the appropriate file for inclusion.

The user completes the compilation template by designating content files unique to the converged infrastructure as configured for the particular customer and any modifications (e.g., conversions) to be performed on the unique content files or the standard content files. The content compiler automatically performs the specified modifications and compiles the content files in accordance with compilation instructions in the compilation template. The content compiler generates a website or other interface for displaying the compiled content set that is easily navigable and accessible. The website may be further customized for the particular customer by including, for example, a customer logo and information on an introduction page linking each of the files in the compiled content set. The content compiler may output the website in an archive file (e.g., a zip file) for distribution to the particular customer. To access the website, the customer uncompresses the archive file and opens an index or start up file, which causes the website to display and permits the customer to navigate the compiled content set.

The various systems and methods disclosed herein provide for automatically creating a content compilation for a particular project. The example implementations discussed herein reference the generation of a framework for a compiled content set describing a converged infrastructure as configured for a particular customer. However, it will be appreciated by those skilled in the art that the presently disclosed technology is applicable to other project types and compilation types. For example, the technology may be implemented in the context of various system or infrastructure configuration, sales, marketing, human resources (e.g., generating an employee handbook), professional or school applications (e.g., generating a resume or school application), real estate (e.g., generating a closing file for the sale of a property), or any other activities involving the distribution, submission, and/or presentation of a plurality of content files.

For a detailed description of an example system 100 for automatically generating a compiled content set for a particular project, reference is made to FIG. 1. As depicted in FIG. 1, a network 102, which may be, without limitation, the Internet, an Intranet, an Ethernet network, a wired network, a wireless network, or the like, is used by one or more computing and/or data storage devices (e.g., one or more databases 110) for implementing the system 100.

In one implementation, the system 100 includes a content compiler 104 for automatically generating a framework for displaying a compiled content set for a particular project. In one implementation, the content compiler is further configured to distribute the framework to a recipient. In another implementation, a user distributes the framework manually to the recipient. The content compiler 104 may be, for example, an add-on to a spreadsheet application (e.g., a Microsoft Excel Add-On) or one or more websites, software applications, interfaces, storage devices, computing components, or the like. The content compiler 104 may be automatically updated via the network 102 or other mechanisms to update software, ensuring that users are utilizing a current version of the content compiler 104.

In one implementation, a user may run the content compiler 104 on a user device 106 or access and interact with the content compiler 104 using the user device 106 communicatively connected to the network 102. In another implementation, the user may run the content compiler 104 on the user device 106 without connection to the network 102. The user device 106 is generally any form of computing device, such as a personal computer, work station, terminal, mobile computer, mobile device, smartphone, tablet, a multimedia console, or the like.

A server 108 hosts the content compiler 104. In one implementation, the server 108 also hosts a website or an application that users may visit to access components of the system 100, including the content compiler 104. The server 108 may be a single server, a plurality of servers with each such server being a physical server or a virtual machine, or a collection of both physical servers and virtual machines. In another implementation, a cloud hosts one or more components of the system 100. The user devices 106, the server 108, and other resources connected to the network 102 may access one or more other servers to access one or more websites, applications, web services interfaces, storage devices, computing devices, etc. that are used to generate a framework for displaying a compiled content set for a particular project. The server 108 may also host a search engine that the content compiler 104 uses for accessing, searching for, and modifying content files.

Content files may be stored in disparate locations in the one or more databases 110 or may be available from other sources accessible via the network 102. For example, content files may be accessible from a customer or recipient website. The content files may be, without limitation, documents, data files, videos, multimedia, images, audio files, webpages, software applications, and other electronic resources.

In one implementation, to create a new content compilation for a particular project, a user selects a compilation type using the content compiler 104. In another implementation, the content compiler automatically initiates the new content compilation based on availability of source files for a compilation type. Available compilation types may correspond to various project types, including, without limitation, system or infrastructure configuration, sales, marketing, human resources, professional or school applications, real estate, or any other activities involving the distribution, submission, or presentation of a plurality of content files. Available compilation types may further correspond to various subtypes associated with a project type. For example, when selecting a compilation type, the user may select converged infrastructure and also a type of converged infrastructure (e.g., Vblock™ System 700). Selecting a compilation type identifies a new compilation template configured for the selected compilation type. For example, the compilation template may include input fields unique to the selected compilation type or include input fields pre-populated with data that is generic to the selected compilation type. In one implementation, the new compilation template is selected from a pool of available compilation templates created by a user and/or an automated tool. In another implementation, the new compilation template is generated in response to input from the user, including the selection of the compilation type.

In the context of a converged infrastructure, to compile the documentation and customize it for the particular converged infrastructure, the content compiler 104 retrieves and pre-populates a compilation template with fields and/or data associated with the selected type of converged infrastructure. For example, the content compiler 104 may pre-populate the compilation template with designations to current versions of standard content files associated with the selected type of converged infrastructure. Stated differently, the content compiler 104 may automatically determine the correct standard content files to include based on the selected converged infrastructure type. As an example, the standard content files may include, without limitation, current versions of: introductory material, an architecture overview, port assignments reference, and the like that correspond to the selected converged infrastructure type.

After selecting the compilation type corresponding to the particular project, the user selects a location in memory to store the compilation template. Alternatively, the content compiler 104 automatically designates or suggests to the user a location in memory to store the compilation template. In one implementation, the compilation template is stored in local memory of the user device 106. In another implementation, the compilation template is stored in the database 110. Using the content compiler 104, the user specifies the content to include in the compiled content set and instructions for generating the framework to display the compiled content set by completing the compilation template.

In one implementation, the user inputs properties for the particular project into the compilation template using the content compiler 104. The properties include general information for the particular project and general instructions for generating the framework for displaying the compiled content set. The properties may further include distribution instructions for distributing the framework to the recipient. For example, in one implementation, the properties include, but are not limited to, a path for an output of an archive file for storing the generated framework for displaying the compiled content set, recipient information (e.g., customer information), format information for the generated framework (e.g., language, appearance and design, links to customizable elements such as Cascading Style Sheets files, etc.), and the like. The archive file may be any file format, such as .ZIP, that is capable of storing and optionally compressing a plurality of content files along with metadata. The content compiler 104 may automatically determine the path for the output of an archive file or the user may select the path. The archive file may be output to local memory of the user device 106. In another implementation, the compilation template is stored in the database 110. In some implementations, the output of the archive file is expedited where a path to local memory on the user device 106 is designated. In another example, the generated framework is output for access by the recipient via an application, interface, website, or the like over the network 102. It will be appreciated that the content compiler 104 may output the generated framework in one or more formats for distribution to or access by the recipient.

The content compiler 104 receives content information into the compilation template for the particular project. The content information includes a designation for each of the content files to be included in the content compilation. The content files include content files unique to the particular project, standard content files, or a combination of both. The designation for each of the content files includes a path (e.g., a network file path, a Uniform Resource Locator ("URL"), database query, etc.) to a source from which the content file may be retrieved and a target file type. The target file type specifies how each content file is to be included in the compiled content set, including modifications to be performed on the content file prior to inclusion. For example, the target file type may specify a target content format (e.g., PDF, HTML, etc.), which may be the same or different than a source content format of the content file. Further, the target file type may specify whether to include the content file with no modifications, exclude the content file from the compiled content set, whether to include the content file name in the table of contents of the generated framework, whether to provide a link to the content file in the table of contents and/or introduction of the generated framework, whether to search for and replace portions of the content file, or the like. Additional compilation instructions may also be specified including, without limitation, whether to delete any portion of the content file prior to inclusion (e.g., delete a sheet from a spreadsheet file), or the like. The content compiler 104 may utilize various programming languages to specify compilation instructions. For example, where the content compiler 104 is a Microsoft Excel Add-On, the compilation instructions may be specified using one or more macros and/or formulae.

As previously described, the content compiler 104 automatically provides a designation for standard content files including a path to a current version of the standard content file associated with the selected compilation type and a default target file type. The user may choose to modify the pre-populated designations of the standard content files or leave the pre-populated designations unchanged. Alternatively or additionally, the content compiler 104 may filter available standard content files based on the selected type of converged infrastructure and present the user with the filtered list to select the appropriate file for inclusion. For example, in one particular example of the converged infrastructure context, a Released Certification Matrix ("RCM") lists the various software products installed on various components of the converged infrastructure and the version of those software products. The content compiler 104 filters the available RCM files based on the selected converged infrastructure type and presents the user with a list of filtered RCM files from which to select the appropriate RCM file. Using the content compiler 104, the user may input designations for content files unique to the particular project. For example, in the converged infrastructure context, the user may designate: a customer logo; a Logical Configuration Survey ("LCS"), which includes information about the particular customer's configuration; a test plan; a deployment audit checklist; cabling, elevations, serial numbers, ports, and other component data; and a Bill of Materials ("BOM").

Once the properties and the content information are input into the compilation template, the content compiler 104 finalizes the compilation template. The content compiler 104 permits the user to specify completed compilation templates for saving, for additional modification, and to repeat for different projects.

In one implementation, the content compiler 104 retrieves a completed compilation template based on input from the user. For example, the user may direct the content compiler 104 to retrieve a saved compilation template or the user may select an option in the content compiler 104 to generate and retrieve a memory representation of an open compilation template.

Once the content compiler 104 retrieves a completed compilation template, the user selects an input or otherwise issues a command to generate a framework for displaying a compiled content set based on the compilation instructions in the compilation template. The content compiler 104 retrieves each of the content files from the designated source in a source file type. In one implementation, the content compiler 104 saves each of the retrieved content files in a temporary directory in local memory of the user device 106.

The content compiler 104 modifies each of the retrieved content files from the source file type to the target file type, which specifies what to do with the content file, if anything, before including the content file in the compiled content set. For example, the content compiler 104 may optionally convert the content file from a source content format to a target content format. The content compiler 104 compiles the modified content files into a compiled content set based on the compilation instructions in the compilation template, including the content information and the properties.

In one implementation, the content compiler 104 generates a framework for displaying the compiled content set, such as a self-contained website, that may be sent to the customer for reference. For example, the content compiler 104 may output an archive file (e.g., a zip file) storing the framework for displaying the compiled content set. The archive file is easily distributable to the recipient (e.g., the customer) for reference. The recipient may open the archive file and select an index or start up file which opens an introduction customized for the particular project and/or recipient and linking each of the files in the compiled content set. It will be appreciated that various framework types and output types may be used. Further, where the generated framework is a website, the website may involve various types of formats, for example, HTML, XML, or the like.

In contrast to the time intensive and inefficient process of conventional documentation compilation, the content compiler 104 generates the framework for displaying the compiled content set quickly and performs modifications to the content files automatically prior to inclusion, as opposed to manually. Additionally, the content compiler 104 permits repeated use of compilation templates or duplicate instructions that may be modified for a particular project. The content compiler 104 further increases efficiency by compiling current and accurate content quickly from disparate sources, such as one or more of the user devices 106 coupled to the network 102 and the one or more databases 110. Further, the content compiler 104 increases accuracy of the compiled content set by automatically retrieving current versions of standard content files associated with the selected compilation type.

Figure 2:
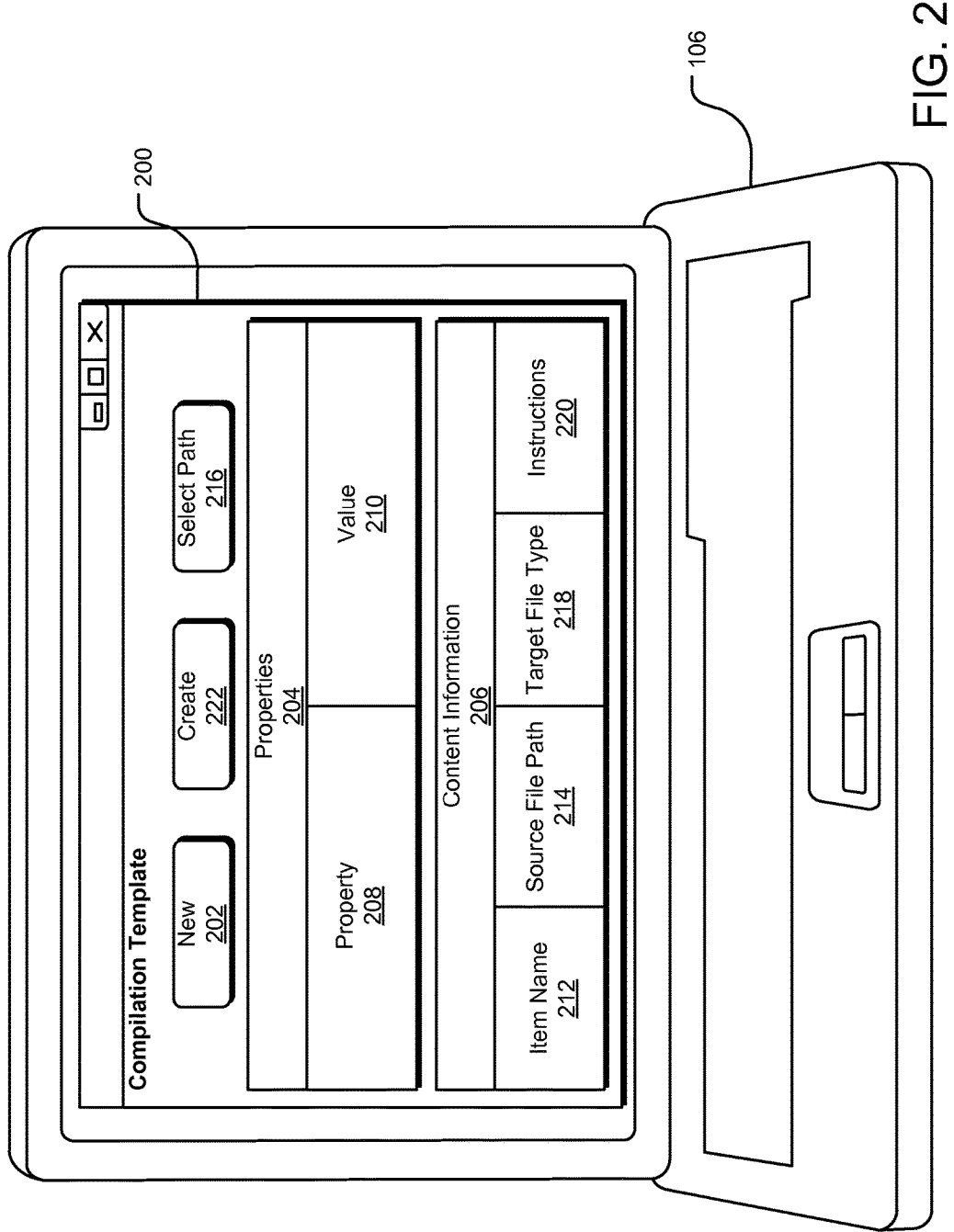
FIG. 2 illustrates an example user interface displaying a compilation template, according to one embodiment.
Figure 3:
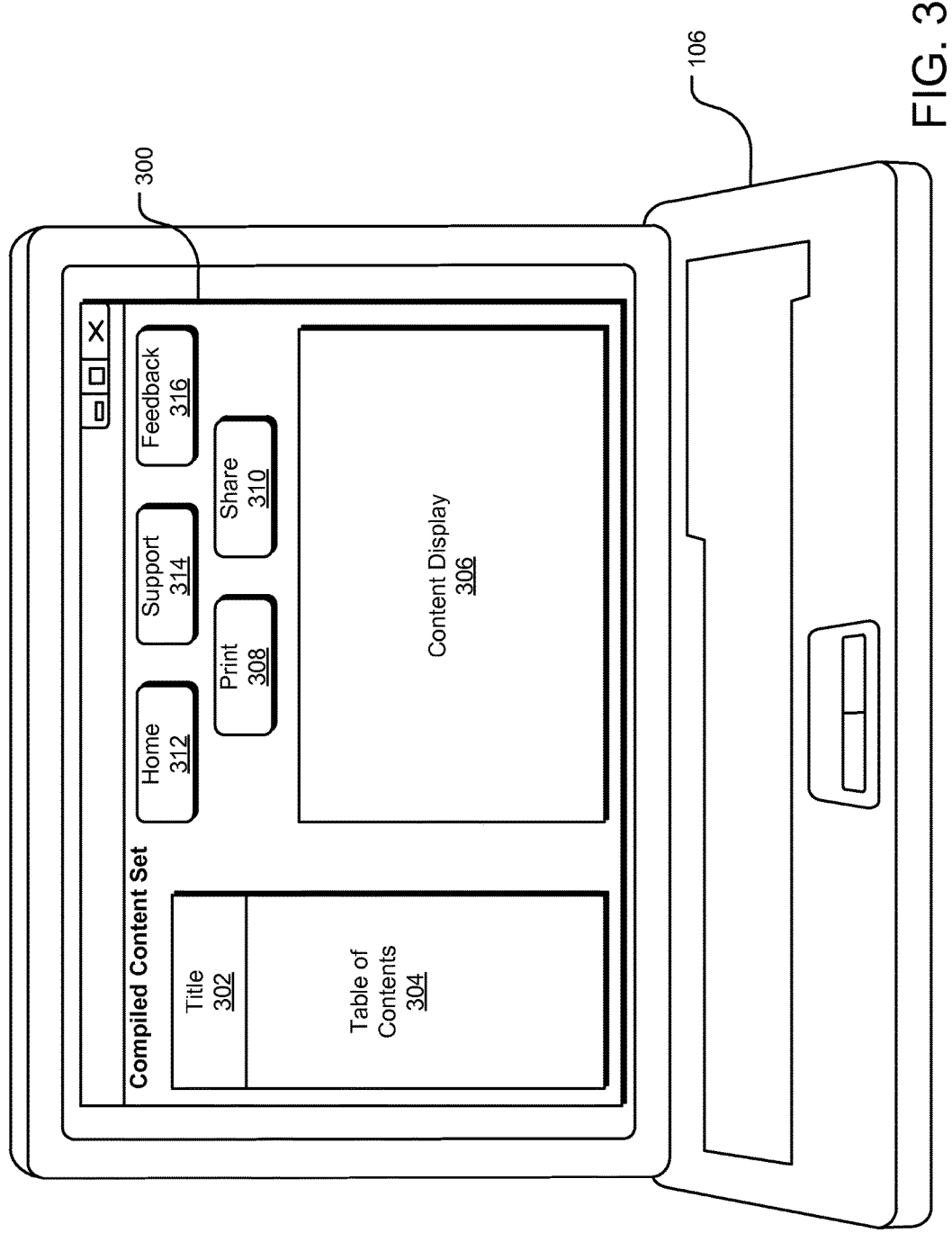
FIG. 3 shows an example user interface displaying generated framework for providing a compiled content set, according to one embodiment.

FIGS. 2-3 show an example user interface displayed on the user device 106 through which access to and interactions with content files for compilation are controlled with the content compiler 104. It will be appreciated by those skilled in the art that such depictions are exemplary only and not intended to be limiting.

FIG. 2 illustrates an example user interface generated by the content compiler 104, the user interface displaying a compilation template 200. In the implementation shown in FIG. 2, the compilation template 200 includes a new button 202 for initiating the creation of a new content compilation for a particular project. Upon selection of the new button 202, the compilation template 200 presents available compilation types and/or subtypes associated with a project type. For example, selecting the new button 202 may cause a window to appear listing available compilation types and/or subtypes for selection. Based on the selected compilation type, the compilation template 200 is loaded with fields that may include pre-populated data. For example, the compilation template 200 may include properties 204 and content information 206.

In one implementation, the properties 204 includes a property field 208 specifying a particular property of the compilation template 200 and a value field 210 specifying compilation instructions corresponding to the property specified in the property field 208. The properties 204 may include pre-populated data, as described herein. The properties 204 may specify, for example, general information for the particular project and general instructions for generating the framework for displaying the compiled content set. In one implementation, the properties include, but are not limited to, a path for an output of an archive file for storing the generated framework for displaying the compiled content set, recipient information (e.g., customer information), format information for the generated framework (e.g., language, appearance and design, etc.), and the like.

In one implementation, the content information 206 includes an item name 212, a source file path 214, a target file type 218, and other compilation instructions 220. As such, the content information 206 includes a designation for each of the content files to be included in the content compilation. The item name 212 specifies the name of the content file to display in the generated framework, and the source file path 214 specifies a path to a source from which the content file may be retrieved. In one implementation, the path may be entered in the source file path 214 directly. In another implementation, a select path button 216 may be selected to navigate to the content file for selection and input into the source file path 214. In still another implementation, keywords may be entered in the source file path 214 to cause the content compiler 104 to retrieve a standard content file. The version of the content file to include in the compilation may be specified in the properties 204. The target file type 218 specifies how the content file is to be included in the compiled content set, including any modifications to be performed on the content file prior to inclusion. For example, the target file type 218 may specify a target content format, which may be the same or different than a source content format of the content file. Further, the target file type 218 may specify whether to: include the content file with no modifications; exclude the content file from the compiled content set; include the content file name in the table of contents of the generated framework; provide a link to the content file in the table of contents and/or introduction of the generated framework; etc. The other compilation instructions 220 may also be specified including, without limitation, whether to delete any portion of the content file prior to inclusion, or the like. As an example, the same content file may be specified more than once in the item name 212 with the same or different target file types specified in the target file type 218, and the other compilation instructions 220 may include instructions to include the content file in the compilation as each target file type specified. Stated differently, the compilation may include a content file, such as a Bill of Materials, in different formats (e.g., PDF, HTML). In one implementation, any of the fields 212, 214, 218, and 220 may be input using macros or similar mechanisms. Once the compilation template 200 is complete, a create button 222 may be selected to generate the framework to display the compiled content set.

Turning to FIG. 3, an example user interface generated by the content compiler 104 is shown displaying a generated framework 300 for displaying the compiled content set. In the implementation shown in FIG. 3, the generated framework 300 is a website that includes a title 302 of the compiled content set and a table of contents or other introduction 304, making the compiled content set easily navigable and each of the content files easily accessible. In one implementation, the title 302, the table of contents 304, and other features of the generated framework 300 are customized for the particular project and/or the recipient of the compiled content set. For example, the framework, the title 302, and/or the table of contents 304 may include customer logos, names, or other information.

In one implementation, the table of contents 304 may provide headings for various content files included in the compiled content set and one or more links with which to navigate to desired content files. Upon selection of one of the links in the table of contents 304, the associated content file is presented in the content display 306, which may be displayed in the same window or one or more separate windows or tabs. The generated framework 300 may include other links or tools for navigating the compiled content set.

The generated framework 300 may include one or more buttons or options for performing operations associated with the compiled content set. For example, a print button 308 may be selected to print one or more of the content files, and a share button 310 may be selected to share one or more of the content files (e.g., via email, social media, or the like). A home button 312 may be included to direct the recipient to a home page of the user that generated the framework or to other sources for additional information or reference. A support button 314 and a feedback button 316 provide the recipient with available resources, including contact information for administrators or other personnel that may provide assistance. In one implementation, the buttons 312, 314, 316, and/or other buttons or features may be minimized to maximize the content display 306. In another implementation, the content display 306 may be maximized to cover the user interface.

Figure 4:
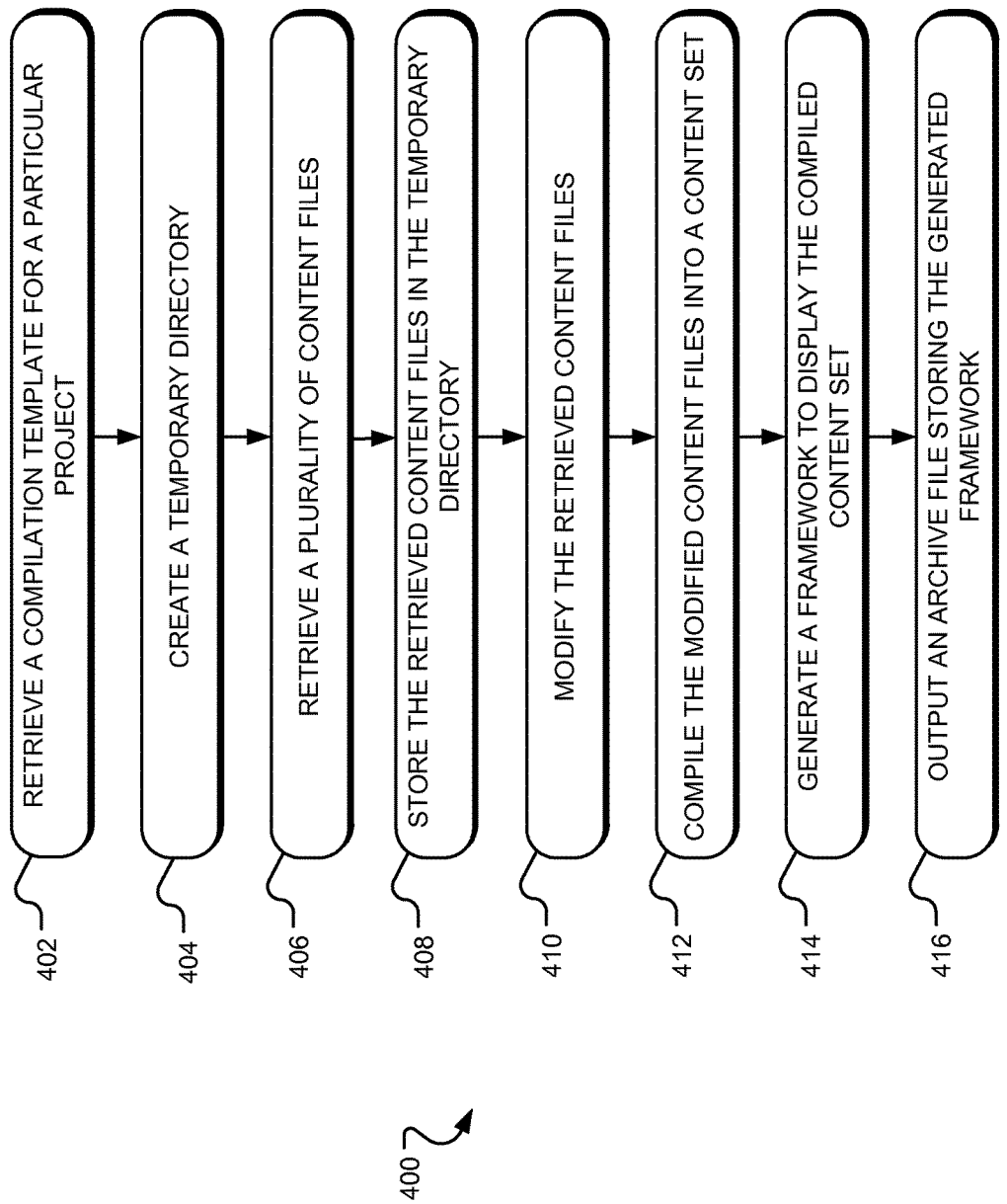
FIG. 4 illustrates example operations for automatically generating a compiled content set for a particular project, according to one embodiment.

FIG. 4 illustrates example operations 400 for automatically generating a compiled content set for a particular project. In one implementation, a retrieving operation 402 retrieves or creates a compilation template for a particular project. The compilation template includes instructions for compiling a plurality of content files. The content files may include content files unique to the particular project, standard content files associated with a selected compilation type for the particular project, or some combination of both. In one implementation, the compilation instructions include a designation for each of the content files including a path to a source of the content file and a target file type. The designation of a standard content file may include a path to a source of a current version of the standard content file. In one implementation, the path to the source of the current version of the standard content file is automatically determined based on the selected compilation type.

In one implementation, a creating operation 404 creates a temporary directory in memory. A retrieving operation 406 retrieves each of the content files from the source. Each of the retrieved content files has a source file type, which may be the same or different than the target file type. A storing operation 408 stores the retrieved content files in the temporary directory.

A modifying operation 410 modifies each of the retrieved content files from the source file type to the target file type. In one implementation, the source file type includes a source content format and the target file type includes a target content format. The modifying operation 410 modifies the retrieved content file by converting the retrieved content file from the source content format to the target content format. In another implementation, the modifying operation 410 modifies the retrieved content file by deleting at least a portion of the retrieved content file. It will be appreciated that the modifying operation 410 may perform various modifications on any of the content files in modifying the content file from the source file type to the target file type based on the compilation instructions included in the compilation template, as described herein.

A compiling operation 412 compiles the modified content files into a content set based on the compilation instructions. A generating operation 414 generates a framework to display the compiled content set. The generated framework may be, for example, a website, and may include an introduction customized for the particular project and linking each of the files in the compiled content set. In one implementation, an outputting operation 416 outputs an archive file storing the generated framework for displaying the compiled content set. The archive file may be, for example, a .ZIP format file. It will be appreciated that the outputting operation 416 may output the generated framework in other manners for easy distribution to a recipient.

Figure 5:
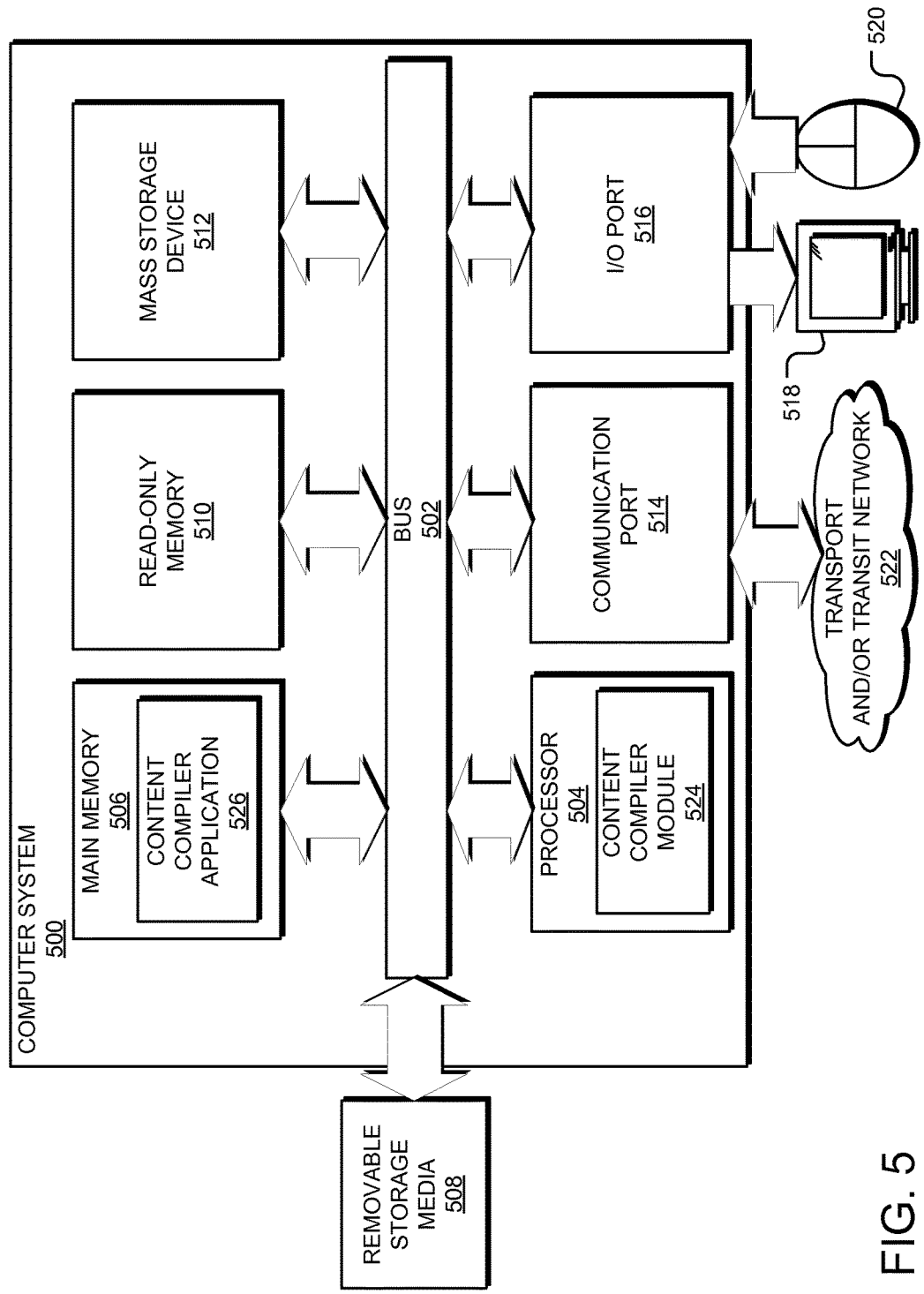
FIG. 5 shows an example computing system that may implement various systems and methods discussed herein, according to one embodiment.

FIG. 5 is an example computing system 500 that may implement various systems and methods discussed herein. The computer system 500 includes one or more computing components in communication via a bus 502. In one implementation, the computing system 500 includes one or more processors 504. The processor 504 may include one or more internal levels of cache (not shown) and a bus controller or bus interface unit to direct interaction with the bus 502. The processor 504 may include a content compiler module 524 that specifically implements the various methods discussed herein. Main memory 506 may include one or more memory cards and a control circuit (not shown), or other forms of removable memory, and may store a content compiler application 526 including computer executable instructions, that when run on the processor 504, implement the methods and systems set out herein. Other forms of memory, such as a removable storage memory 508, a read only memory 510, and a mass storage device 512, may also be included and accessible, by the processor (or processors) 504 via the bus 502.

The computer system 500 may further include a communication port 514 connected to a transport and/or transit network 522 by way of which the computer system 500 may receive network data useful in executing the methods and system set out herein as well as transmitting information and network configuration changes determined thereby. The computer system 500 may include an I/O port 516, or other device, by which information is displayed, such as at display screen 518, or information is input, such as with input device 520. The input device 520 may be alphanumeric input device, including alphanumeric and other keys for communicating information and/or command selections to the processor 504. The input device 520 may be another type of user input device including cursor control, such as a mouse, a trackball, or cursor direction keys for communicating direction information and command selections to the processors 504 and for controlling cursor movement on the display device 518. In the case of a tablet device, the input may be through a touch screen, voice commands, and/or Bluetooth connected keyboard, among other input mechanisms. The system set forth in FIG. 5 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer. The computer-readable storage medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for automatically compiling content, the method comprising:
   retrieving, using instructions stored in a memory and executed by a processor, a compilation template based on a type of a particular converged infrastructure, the compilation template comprising a plurality of input fields and compilation instructions for compiling the plurality of input fields;
   populating, using instructions stored in a memory and executed by a processor, one or more of the compilation template input fields with:
      stored designations to standard content files associated with the type of the particular converged infrastructure, each stored designation including a path to a source of a standard content file in a storage device and a target file type; and
      received designations to unique content files uniquely associated with the type of the particular converged infrastructure, each received designation including a path to a source of a unique content file in a storage device and a target file type, wherein the target file types of stored designations and the received designations include modification instructions for the respective standard content files and unique content files;
   retrieving, using the instructions stored in the memory and executed by the processor, each of the standard and unique content files based on the stored and received designations populated in the input fields, each of the retrieved standard and unique content files having a source file type;
   generating, using the instructions stored in the memory and executed by the processor, modified content files by modifying each of the retrieved standard and unique content files from the corresponding source file type to the corresponding target file type by applying any modifications specified by the modification instructions included in the corresponding target file type;
   compiling, using the instructions stored in the memory and executed by the processor, the modified content files into a compiled content set based on the compilation instructions of the compilation template; and
   generating, using the instructions stored in the memory and executed by the processor, a framework to display the compiled content set.

2. The method of claim 1, further comprising:
   outputting an archive file storing the generated framework for displaying the compiled content set.

3. The method of claim 2, wherein the archive file comprises a zip file.

4. The method of claim 1, wherein the designation of the standard content file includes a path to a source of a current version of the standard content file.

5. The method of claim 4, wherein the path to the source of the current version of the standard content file is automatically determined based on the type of the particular converged infrastructure or a selected compilation type of the compilation template.

6. The method of claim 1, wherein the source file type includes a source content format and the target file type includes a target content format, the modification of the retrieved content file including converting the retrieved content file from the source content format to the target content format.

7. The method of claim 1, wherein modifying one or more of the retrieved content files from the source file type to the target file type includes deleting at least a portion of the retrieved content file.

8. The method of claim 1, wherein the generated framework comprises a website.

9. The method of claim 1, wherein the generated framework includes an introduction customized for the particular converged infrastructure, the introduction including a link to each of the content files in the compiled content set.

10. The method of claim 1, wherein the particular converged infrastructure is associated with a particular customer.

11. The method of claim 10, wherein one or more of the unique content files are unique to a configuration of the particular converged infrastructure for the particular customer and one or more of the standard content files are associated with a selected type of the particular converged infrastructure.

12. The method of claim 11, wherein one or more designations of the standard content files include a path to a source of a current version of a corresponding standard content file that is automatically determined based on the selected type of the particular converged infrastructure.

13. One or more non-transitory tangible computer-readable storage media storing computer-executable instructions for performing a computer process on a computing system, the computer process comprising:
    retrieving a compilation template based on a type of a particular converged infrastructure, the compilation template comprising a plurality of input fields and compilation instructions for compiling the plurality of input fields;
    populating one or more of the compilation template input fields with:
        stored designations to standard content files associated with the type of the particular converged infrastructure, each stored designation including a path to a source of a standard content file in a storage device and a target file type; and
        received designations to unique content files uniquely associated with the type of the particular converged infrastructure, each received designation including a path to a source of a unique content file in a storage device and a target file type, wherein the target file types of stored designations and the received designations include modification instructions for the respective standard content files and unique content files;
    retrieving each of the standard and unique content files from based on the stored and received designations populated in the input fields, each of the retrieved standard and unique content files having a source file type;
    generating modified content files by modifying each of the retrieved standard and unique content files from the corresponding source file type to the corresponding target file type by applying any modifications specified by the modification instructions included in the corresponding target file type;
    compiling the modified content files into a compiled content set based on the compilation instructions of the compilation template, using a processor; and
    generating a framework to display the compiled content set.

14. The one or more non-transitory tangible computer-readable storage media of claim 13, wherein the particular converged infrastructure is associated with a particular customer, the unique content files including at least one content file unique to a configuration of the particular converged infrastructure for the particular customer and at least one standard content file associated with a selected type of the particular converged infrastructure, the designation of the standard content file including a path to a source of a current version of the standard content file that is automatically determined based on the selected type of the particular converged infrastructure.

15. A system for automatically compiling content, the system comprising:
    one or more storage devices storing a plurality of content files including at least one standard content file associated with a compilation type and at least one unique content file uniquely associated with a type of a particular converged infrastructure; and
    a user device in communication with the one or more storage devices over a network, the user device having at least one processor configured to generate a framework to display a compiled content set having a subset of the plurality of content files compiled according to a compilation template for the particular converged infrastructure, wherein the compilation template:
        is retrieved based on the type of the particular converged infrastructure;
        comprises a plurality of input fields and compilation instructions for compiling the plurality of input fields; and
        is populated with a designation for each of the subset of the plurality of content files, the designation including a path to a source of the content file in the one or more storage devices and a target file type, the target file type including modification instructions for the content file;
    the at least one processor retrieving each of the subset of the plurality of content files from the source in the one or more storage devices over the network based on the populated designations, each of the retrieved content files having a source file type, the at least one processor modifying at least one of the retrieved content files from the source file type to the target file type by applying one or more modifications specified by the modification instructions included in the target file type of the retrieved content file.

16. The system of claim 15, wherein the target file type is the same as the source file type such that no modification is performed on the content file.

17. The system of claim 15, wherein the particular converged infrastructure is associated with a particular customer.

18. The system of claim 17, wherein the content files include at least one unique content file uniquely associated with a configuration of the particular converged infrastructure for the particular customer and at least one standard content file associated with a selected type of the particular converged infrastructure, the designation of the standard content file including a path to a source of a current version of the standard content file that is automatically determined based on the selected type of the particular converged infrastructure.

* * * * *